United States Patent Office 3,490,445
Patented Jan. 20, 1970

3,490,445
PLASTER OF PARIS BANDAGE
Perttu V. Laakso, Barrington, Ill., assignor to The Kendall Company, Boston, Mass., a corporation of Massachusetts
No Drawing. Filed Mar. 4, 1966, Ser. No. 531,745
Int. Cl. A61f 13/04
U.S. Cl. 128—91        3 Claims

ABSTRACT OF THE DISCLOSURE

The crushing strength of plaster of Paris bandages is increased by omitting all non-volatile residue-leaving retarders while still achieving fast cast setting times by utilizing as an accelerator set plaster which is formed primarily in situ during drying of a coating of the unset plaster slurry applied to the bandage carrier. The accelerating action of the in situ formed set plaster as seeds for crystallization when rewet provides a substantially entirely post-slurry accelerator action.

---

This invention relates to plaster of Paris bandages and more particularly to such bandages having high crushing strength after fast and even extra fast setting.

The requirement of application of plaster of Paris to a carrier such as crinoline, while retaining the plaster of Paris in unset form for later re-wetting, molding application, as to a human limb, and setting has led to routine inclusion of setting inhibitors or retarders in the original mix. These inhibitors or retarders are driven off by drying the mix after it is coated or otherwise applied to the carrier. Most retarders leave residues which affect final setting time and hence reduce the one hour crushing strength of the final set plaster and all of them are expensive.

Moreover, to overcome any residual effect of any included retarders and thus accelerate the setting time to practical values, substantial amounts of accelerators are included, also at additional expense and with a loss in one hour crushing strength.

It has thus been exceedingly difficult to attain highest one hour crushing strength when such retarders and accelerators or either of them are included.

A primary object of the invention therefore is to provide a plaster of Paris bandage having unusually high one hour crushing strength and commercially acceptable setting time.

It is a further object of the invention to provide a method of producing a hard-coated plaster of Paris bandage having when rewetted and dried an unusually high one hour crushing strength by a novel rapid drying procedure involving formation of a controlled amount of gypsum and using no non-volatile retarders and a minimum of additional accelerator.

This invention is founded on the discovery that by properly controlling mixing procedures and total "wet time" by plaster of Paris, from initial wetting through application and drying on the carrier, neither retarders nor accelerators are requisite to form bandages which meet and exceed high Government specifications both with respect to setting time and one hour crushing strength.

The procedure of this invention and the resulting bandage are made possible by careful mixing, timing and drying techniques to form from a plaster of Paris slurry originally containing no gypsum, seeds of set plaster or gypsum from the plaster which is in solution when extra water is forced out during drying.

The procedure of this invention therefore includes forming in an aqueous plaster of Paris slurry a sufficient quantity of plaster in solution so that, after a very rapid application and drying on the carrier, there are sufficient seeds present on the dried bandage to act as accelerators to the extent of reducing the setting time to the order of 4–8½ minutes. But it is an essential part of the invention to insure that substantially no crystallization is induced before drying commences so that the dried coating contains no more than about 2% set plaster, the remaining plaster of Paris content of the coating being substantially all unset calcium sulphate. Otherwise, the cast will be crumbly and the one hour and ultimate set crushing strength materially reduced.

While the formation of seeds in wet plaster of Paris occurs naturally in about 4–5 minutes and seed formation may be accelerated by rapid mechanical mixing it is preferred that mixing be at such speeds and intensities as not to create seeds in the wet plaster. This is particularly true where a setting time of the rewetted bandage is desired in the range of 6–8½ minutes which is the bandage preferred in about 90% of the cases. However, if shorter setting time periods are desired it is theoretically possible to obtain a faster setting time by mechanical agitation which forms crystals in the wet plaster. Though bandages which set in 2½–4 minutes have been produced by this method in 200 yard lengths 40 inches wide by a batch operation with cast crushing strength at one hour in excess of 400 pounds, in any continuous operations, formation of set plaster in the mixing chamber and delivery pipes may cause stoppages where the delivery of the wet seeded slurry is interrupted. Where such extra fast bandages are desired, therefore, it is preferred not to create any set plaster until after the slurry has been applied to the carrier and then to use about ½% of potassium sulphate or 1½% of ground gypsum coated on or adhered by a binder to the crinoline backing, based on the weight of the dry plaster which may be of the order of 400 grams of dry plaster per square yard of carrier. This may give about 4% of the weight of the crinoline as dried potassium sulphate or 12% as dried gypsum as a proper concentration for normal thicknesses of plaster coating.

The permissible wet time (which is dependent upon the conditions of mixing) is in fact so short that from the time the plaster first becomes wetted with water in the absence of a retarder until it emerges dry on the carrier from an oven should not exceed 3–5 minutes. This means that, for commercial purposes, the mixing is carried out in small volume in a kettle which contains at any one time only sufficient material to coat 0.5–1 minute's production of dry coated carrier and includes a continuous feed of dry plaster of Paris and water separately to the kettle. Thus, for example, one can accomplish the objects of this invention by metering dry plaster of Paris, e.g. Industrial White Screened Hydrocal at the rate of ten pounds per minute into a kettle to which is also being added continuously ¾ of a gallon per minute of an aqueous solution, preferably containing a binder, the kettle having an outlet leading to a pump which maintains the level in the kettle. The output is spread onto a running carrier web moving at the rate of 16 yards per minute with the carrier traversing an oven 30 feet long wherein the temperature is maintained at about 200–220° F. to produce a coating which in dry air will not further hydrate after moving out of the oven.

The mixing kettle is provided with a rotating blade mixer. In the case of a 4-inch by 1½-inch blade its speed can be in the range of 350 to 750 r.p.m. without causing seeding in the wet plaster until the oven is reached to insure final setting times in the range of 6–8½ minutes.

Too great mechanical agitation either by reason of excessive blade speed or by excessive time of agitation results in creation of too much, i.e. above 2% set plaster. Thus under the above conditions, a speed of 1000 r.p.m. is altogether too much and even at the lower speeds if mix remains in the kettle too long under agitation, it may set up there or at best there will be so much seeding that a very fast setting bandage is produced.

A suitable binder or adhesive if included may be a water soluble polyvinyl alcohol or any of the adhesives referred to at column 2 lines 6–11 of United States Patent No. 2,655,148.

In order to facilitate the production of bandages in accordance with the method of this invention, it is desirable, although not essential, to use proportions up to 10% of the total liquid in the mixing kettle of a retardent such as ethyl, methyl or isopropyl alcohol. This amount of these alcohols has little effect upon the amount of plaster going into solution and it has no appreciable effect upon the one hour cast crushing strength since these volatile alcohols evaporate without residue.

A suitable carrier is 32–28 surgical gauze which may be coated in accordance with the above process in such manner that a 4-inch by 5-yard sample weighs more than 207 grams providing upon rewetting and setting a cast one hour crushing strength in excess of 400 pounds, both values being determined by the procedures set forth in U.S. Government Specifications GG–B–101C, June 2, 1959, as are the setting times as referred to in this specification and in the accompanying claims.

While surgical gauze and crinoline have been indicated as suitable carriers for coating in accordance with the invention with surgical gauze being preferred, other fibrous and non-fibrous webs to which plaster will adhere including nonwoven and cross-laid fabrics, netlike extrusions of resins and apertured films are also suitable as carriers.

What is claimed is:

1. The method of making a hard-coated plaster of Paris bandage suitable for being rewetted and reformed into a hard cast comprising continuously feeding an aqueous binder solution and unset dry plaster of Paris separately and simultaneously into a mixing kettle, thoroughly mixing said solution and said unset plaster to form a slurry containing no set plaster while controlling the intensity of mechanical agitation, the mixing time and the content of the binder solution so that 1–2% of the unset plaster goes into solution but substantially no seeds of set plaster are formed so long as the plaster is in slurry form, spreading said slurry upon a carrier and drying said spread plaster slurry to form a hard-coated bandage with said plaster in solution being converted to set plaster.

2. The method as claimed in claim 1 wherein the binder solution includes a maximum of 10% of a volatile retardent which leaves no residue.

3. The method as claimed in claim 1 wherein the bandage includes not more than ½% by weight of plaster spread thereon of an accelerator other than said in situ formed set plaster of Paris.

References Cited

UNITED STATES PATENTS 3,223,082   12/1965   Smith _____ 106—111

JAMES E. POER, Primary Examiner

U.S. Cl. X.R.

106—110, 111, 114